US008972676B2

(12) United States Patent
Benhase et al.

(10) Patent No.: US 8,972,676 B2
(45) Date of Patent: Mar. 3, 2015

(54) ASSIGNING DEVICE ADAPTORS AND BACKGROUND TASKS TO USE TO COPY SOURCE EXTENTS TO TARGET EXTENTS IN A COPY RELATIONSHIP

(75) Inventors: Michael T. Benhase, Tucson, AZ (US); Theresa M. Brown, Tucson, AZ (US); Lokesh M. Gupta, Tucson, AZ (US); Carol S. Mellgren, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 13/016,834

(22) Filed: Jan. 28, 2011

(65) Prior Publication Data

US 2012/0198150 A1  Aug. 2, 2012

(51) Int. Cl.
*G06F 12/00* (2006.01)
*G06F 3/06* (2006.01)
*G06F 11/14* (2006.01)

(52) U.S. Cl.
CPC .............. *G06F 3/065* (2013.01); *G06F 3/0617* (2013.01); *G06F 3/067* (2013.01); *G06F 11/1466* (2013.01)
USPC ........... 711/158; 711/114; 711/151; 711/162; 707/640; 707/649; 707/736; 707/781; 707/812

(58) Field of Classification Search
CPC .......................... G06F 11/1448; G06F 11/1456
USPC .......... 711/114, 151, 158, 162; 707/640, 649, 707/812
See application file for complete search history.

(56) References Cited

U.S. PATENT DOCUMENTS

| 6,189,079 | B1 * | 2/2001 | Micka et al. | 711/162 |
|---|---|---|---|---|
| 7,085,892 | B2 * | 8/2006 | Martinez et al. | 711/133 |
| 8,443,241 | B2 * | 5/2013 | Chiu et al. | 714/700 |
| 2004/0260870 | A1 * | 12/2004 | Factor et al. | 711/112 |
| 2005/0283564 | A1 * | 12/2005 | LeCrone et al. | 711/100 |

(Continued)

OTHER PUBLICATIONS

"FlashCopy Source Read Minimising Background Copy Algorithm", IBM Corp., Technical Disclosure, IP.com No. IPCOM000188465D, Oct. 9, 2009, pp. 1-2.

*Primary Examiner* — Reba I Elmore
(74) *Attorney, Agent, or Firm* — David W. Victor; Konrad Raynes Davda & Victor LLP

(57) ABSTRACT

Provided are a computer program product, system, and method for assigning device adaptors and background tasks to use to copy source extents to target extents in a copy relationship. A relation is provided of a plurality of source extents in source ranks to copy to a plurality of target extents in target ranks in the storage system. One target rank in the relation is used to determine an order in which the target ranks in the relation are selected to register for copying. For each selected target rank in the relation selected according to the determined order, an iteration of a registration operation is performed to register the selected target rank and a selected source rank copied to the selected target rank in the relation. The registration operation comprises indicating in a device adaptor assignment data structure a source device adaptor and target device adaptor to use to copy the selected rank to the selected target rank and adding an entry to a priority queue for the relation for the selected target rank. The selected source rank is copied to the selected target rank using as the source and target device adaptors indicated in the device adaptor assignment data structure for the selected target rank in response to processing the entry in the priority queue added to the priority queue for the selected target rank.

24 Claims, 6 Drawing Sheets

(56) References Cited

U.S. PATENT DOCUMENTS

| | | | |
|---|---|---|---|
| 2009/0300315 A1* | 12/2009 | Agombar et al. | 711/170 |
| 2010/0180094 A1 | 7/2010 | Min et al. | |
| 2011/0016271 A1* | 1/2011 | Ash et al. | 711/113 |
| 2012/0150858 A1* | 6/2012 | Ripberger | 707/737 |

\* cited by examiner

Relation Information

Priority Queue Entry

ASSIGNING DEVICE ADAPTORS AND BACKGROUND TASKS TO USE TO COPY SOURCE EXTENTS TO TARGET EXTENTS IN A COPY RELATIONSHIP

BACKGROUND OF THE INVENTION

1. Field of the Invention

The present invention relates to a computer program product, system, and method for assigning device adaptors and background tasks to use to copy source extents to target extents in a copy relationship.

2. Description of the Related Art

In a storage environment, volumes may be mirrored to other volumes to provide redundant copies of data. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data. Point-in-time copy techniques, such as the IBM FlashCopy® (FlashCopy is a registered trademark of International Business Machines, Corp. or "IBM"), typically defer the transfer of a data back to the copy volume until a write operation is requested to that data block on the source volume. Data transfers may also proceed as a background copy process with minimal impact on system performance. Until the actual data transfer occurs, reads are directed to the data blocks on the source volume. The point-in-time copy relationships that are immediately established in response to the point-in-time copy command include a bitmap or other data structure indicating the location of blocks in the volume at either the source volume or the copy volume.

A storage controller that receives establish FlashCopy commands to establish multiple copy relations of source volumes to target volumes may not have sufficient available resources to perform all of the corresponding background copy tasks simultaneously for all the copy relations. Available resources are limited by the ranks, device adapters and available tasks. For instance, in certain systems, a maximum of four background copy tasks per device adapter can be active at once. Thus, if there are four device adaptors, then there may be a maximum of 16 active background copy tasks. When a background copy operation for a relation is registered to copy a source volume to a target volume, the copy relation is put into a Background Copy Control Throttling (BCCT) rank queue and into a BCCT priority queue to wait for an opportunity to start copying. The BCCT scheduler is then dispatched. The purpose of the rank queues is to balance the work between the device adapters and between the ranks. The purpose of the priority queue is to choose background copy tasks for relations according to the importance of running the task. The BCCT scheduler will locate a target relation to activate its background copy task based on the priority of the relation and the device adaptor and rank constraints. The BCCT scheduler searches for a candidate by first querying the BCCT priority queue. Priorities in the priority queue are set based upon the time the copy relation was established. The BCCT scheduler ensures that the N (such as 4) highest priority relations in the cluster are currently copying. If they are already running, then the BCCT scheduler will go through the first C (say 100) elements in the priority queue to find a relation that fits the rank and device adaptor. If a relation is found, then the BCCT scheduler activates the copy relation. Otherwise, the BCCT scheduler searches through device adapter and rank structures to find a suitable candidate on which to activate the agent.

The BCCT scheduler determines which relations fit the rank and device adaptor constraints by using the following preference algorithm:

1. Choose a device adaptor with less than the maximum number of active background copy tasks that are using this device adaptor, e.g., 4.
2. Choose a device adaptor with the least number of active background copy tasks that are using this device adaptor.
3. Choose a rank under that device adaptor with the least number of active background copy tasks that are running in this cluster.
4. Choose a device adaptor with the highest number of waiting agents.

The BCCT scheduler maintains data structures to assign relations and their ranks to source and target device adaptors. A BCCT rank queue has entries linked into two separate queues, the corresponding rank queue and the cluster's priority queue. The target relation entry contains pointers to the previous and the next relation entry in each one of the queues. Two pointers are needed for each list to support insertion and removal of elements from the middle of the queue. The priority queue contains the relations that are waiting for the background copy task to start in the order of importance. The order of the elements in the queue will be dynamically changed according to the current importance of each relation. For the first phase of implementation, the order of the elements in the priority queue will be according to the establish time. The relation will be inserted to the priority queue only after the asynchronous destage and discard scans complete in order to improve the performance of the background copy task. In the second phase, preference is added to the priority queue and the placement of the elements in the queue are changed dynamically. The purpose of the device adaptor (DA) and rank structures is to allow fast searching for a relation that fits the rank and DA constraints.

FIG. 1 illustrates an embodiment of the device adaptor 2 and rank 4 data structures as known in the prior art. An array 2 of target device adaptor entries includes one entry 6a, 6b, 6c . . . 6n for each possible target device adaptor and a list of ranks 8a, 8b, 8c . . . 8n assigned to each target device adaptor 6a, 6b, 6c . . . 6n, respectively. The lists 8a, 8b, 8c . . . 8n each include ranks that have target relations which are waiting for the background copy task to start. The list is dynamic, i.e. ranks are added and deleted when adding and removing the first and the last target relation for the rank. Further, for each target device adaptor there are counters of active and waiting agents. The counters are used to optimize the search algorithm and to choose an agent according to the DA's throughput limitations.

For the source ranks, there is an array of n rank entries 10a, 10b . . . 10n, one entry 10a, 10b . . . 10n for each of the n ranks in the system. For each rank entry 10a, 10b . . . 10n there are four anchors 12a, 12b . . . 12n (only one set of the anchors for rank 10a is shown in FIG. 1), one for each source device adaptor, where each anchor 12a, 12b . . . 12n links to a relation list 14a, 14b . . . 14n of relations that are waiting for background copy tasks to start. There is one anchor 12a, 12b . . . 12n for each device adaptor 102a, 102b . . . 102n in the cluster. The device adaptor represented by the anchor 12a, 12b . . . 12n is used to copy the source extent from the source rank to the target rank. For each source device adaptor represented by the anchors 12a, 12b . . . 12n, there is a counter of active agents on the rank. The counter is used to optimize the search algorithm and to choose an agent according to the rank's throughput limitations. Further, there are pointers to the previous and the next ranks 10a, 10b . . . 10n in the rank list 4. The BCCT scheduler locates the relation that fits the rank and device adaptor by querying only the top of the ranks queues.

To copy a source extent to a target extent for a relation accessed from the priority queue, a plurality of copy agents may be assigned to copy the extent. Each of the assigned background copy agents processes a different section of the volume. These agents are running at the same time. The background copy agents start copying from the end of their region to the beginning of the region. Because a target of the relation may have extents from many different ranks, current background copy agents copy extents in the order of rank number (lowest rank number to highest rank number). If there are background copy tasks for many relations, then all agents will first queue ranks in order, rank 0, rank 1, rank 2 etc.

There is a need in the art for improved techniques for allocating agents to copy source extents from source ranks to target extents in target ranks as part of a copy operation.

SUMMARY

Provided are a computer program product, system, and method for assigning device adaptors and background tasks to use to copy source extents to target extents in a copy relationship. A relation is provided of a plurality of source extents in source ranks to copy to a plurality of target extents in target ranks in the storage system. One target rank in the relation is used to determine an order in which the target ranks in the relation are selected to register for copying. For each selected target rank in the relation selected according to the determined order, an iteration of a registration operation is performed to register the selected target rank and a selected source rank copied to the selected target rank in the relation. The registration operation comprises indicating in a device adaptor assignment data structure a source device adaptor and target device adaptor to use to copy the selected rank to the selected target rank and adding an entry to a priority queue for the relation for the selected target rank. The selected source rank is copied to the selected target rank using as the source and target device adaptors indicated in the device adaptor assignment data structure for the selected target rank in response to processing the entry in the priority queue added to the priority queue for the selected target rank.

DETAILED DESCRIPTION

Figure 2:
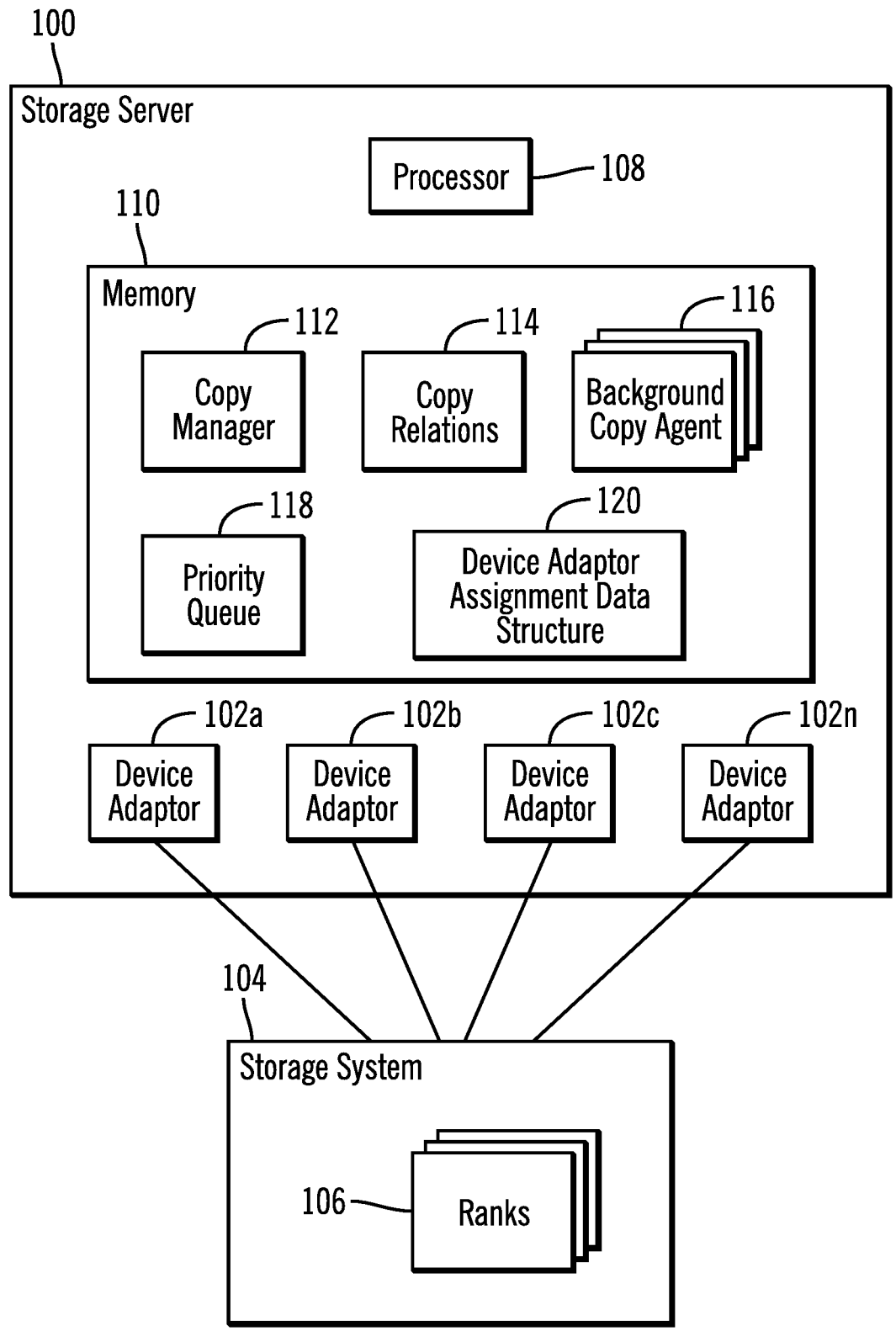
FIG. 2 illustrates an embodiment a computing environment.

FIG. 2 illustrates an embodiment of a storage server 100 having a plurality of device adaptors 102a, 102b, 102c . . . 102n to connect to a storage system 104. The storage system may comprise one or more arrays of storage devices combined to create a logically contiguous storage space called ranks 106, such as a Redundant Array of Independent Disk (RAID) ranks 106. On a multi-array rank, data is striped across the arrays in the rank to improve performance. Each rank 106 may be divided into equal-sized segments known as extents. The extents are the building blocks of the logical volumes and extents are striped across all disks of an array. The storage server 100 receives Input/Output (I/O) requests from connected hosts directed to locations in the storage system 104.

In certain embodiments, the extents comprise portions of a RAID rank that are striped across multiple disks. In an alternative embodiment, an extent may comprise another grouping of data blocks in storage. Further, in alternative embodiments, a rank may comprise a grouping or set of extents in the storage system 104 other than a RAID rank.

The storage server 100 further includes a processor 108 and a memory 110 having a copy manager 112, copy relations 114, background copy agents 116, a priority queue 118, and a device adaptor assignment data structure 120. The copy relations 114 provide a relation for each copy operation to copy a source volume to a target volume, where the volumes may be comprised of a plurality of extents so that the copy relations 114 define source extents to copy to target extents. The copy manager 112 manages the copying of source extents to target extents for copy relations 114. The copy manager 112 maintains a priority queue 118 in which to register ranks and extents of relations to copy, and processes entries in the priority queue 118 to spawn background copy agents 116 to handle the copying of source extents to target extents. The device adaptor assignment data structure 120 provides an assignment of source and target device adaptors to use for relations to balance the assignment of device adaptors to source and target ranks to use for copying the extents in copy relations 114. In one embodiment, the device adaptor assignment data structure 120 may comprise the structure of FIG. 1.

The storage system 104 system may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, etc.

In FIG. 2, the copy manager 112 is shown as a software program in the memory 110 executed by the processor 108. In an alternative embodiment, the copy manager 112 may be implemented in a hardware component, such as dedicated integrated circuit, e.g., Application Specific Integrated Circuit (ASIC), expansion card, etc., in the storage server 100 or implemented as a combination of hardware or software.

Figure 3:
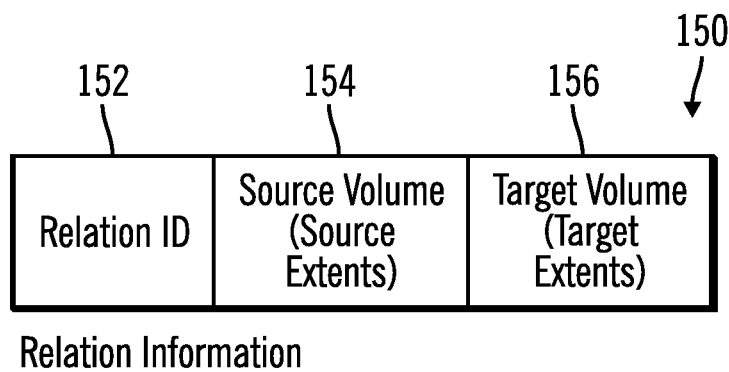
FIG. 3 illustrates an embodiment of copy relation information.

FIG. 3 illustrates an embodiment of an instance of copy relation information 150 maintained in the copy relations 114 for one copy relation including a copy relation identifier (ID) 152 identifying a relation of a source volume 154 to copy to a target volume 156, wherein the source volume 154 is comprised of source extents configured in one or more source ranks and the target volume 156 is comprised of target extents configured in one or more target ranks.

Figure 4:
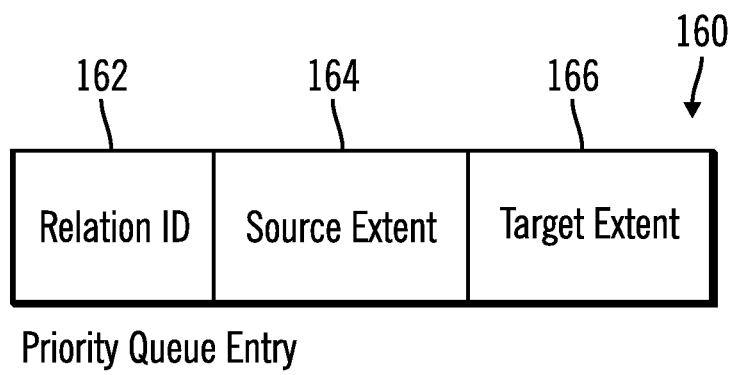
FIG. 4 illustrates an embodiment of a priority queue entry.

FIG. 4 illustrates an embodiment of an entry 160 maintained in the priority queue 118, which includes a copy relation ID 162, which is a copy relation for which extents are to be copied, a source extent 164, and a target extent 166. The copy manager 112 would add an entry 160 to the priority queue 118 for each of the source extents 154 and target extents 156 defined for the relation 162 that is queued.

Figure 5:
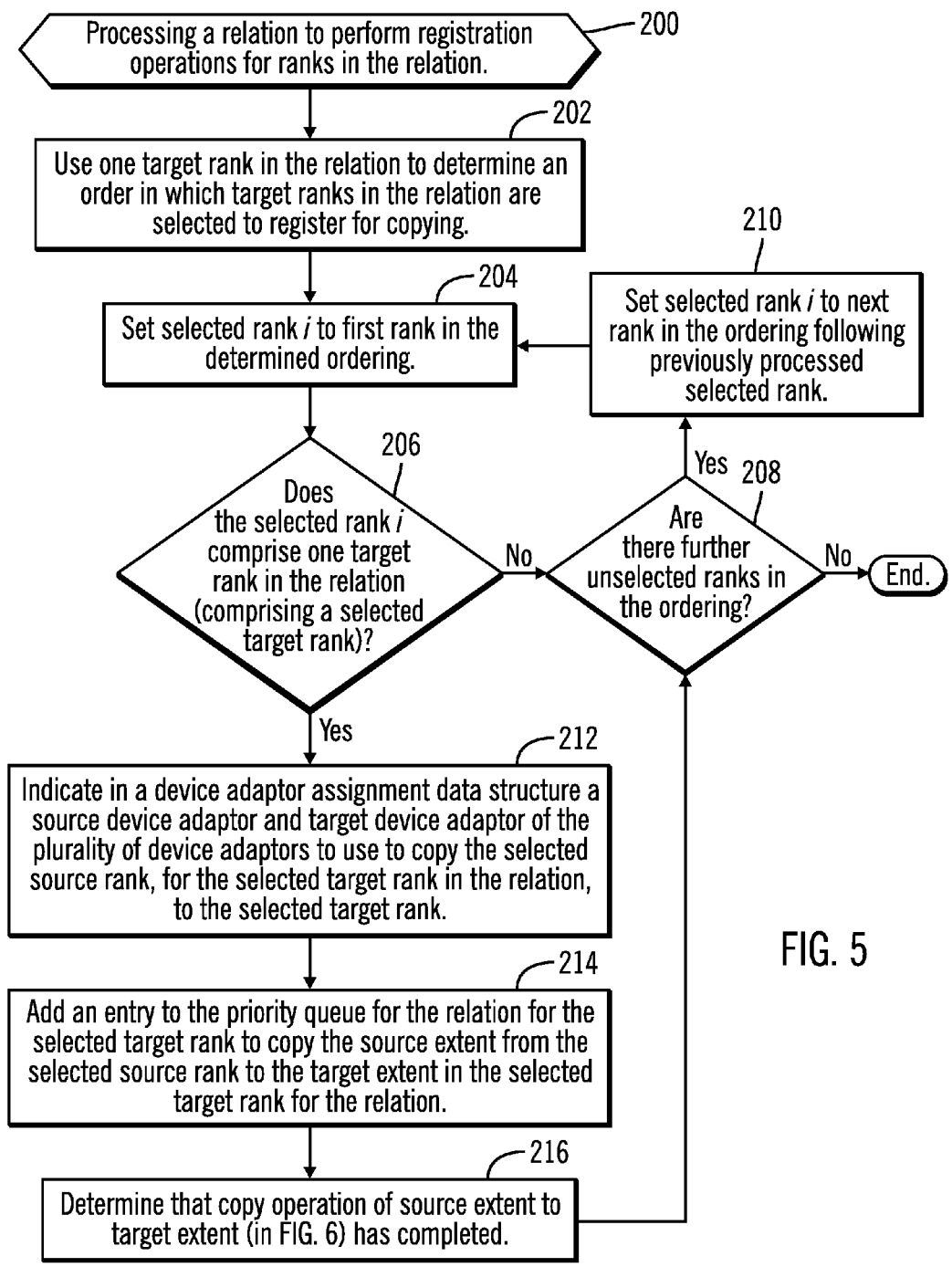
FIG. 5 illustrates an embodiment of operations to register source and target extents in a copy relation for copying.

FIG. 5 illustrates an embodiment of operations performed by the copy manager 112 to register source and target extents for a relation 150 to copy in the priority queue 118. Upon processing (at block 200) a relation 150 to perform operations for ranks of extents in the relation, the copy manager 112 uses one target rank having a target extent in the relation to determine an order in which target ranks in the relation are selected to register for copying. In one embodiment, the target rank used to determine the order in which target ranks are selected for copying comprises a first target rank including a first target extent in the relation 150, which may comprise the first target extent in the target volume 154 of the relation 150. In a further embodiment, the copy manager 112 may consider all ranks 106 in the storage system 104 when determining the order in which target ranks in the relation 150 are selected for copying. In such an embodiment the order may comprise the first rank in the relation (i.e., rank having the first target extent in the volume 154) to a maximum number of ranks 106 in the storage system 104 and then from a first rank 0 in the storage system 104 to a rank in the storage system preceding the first rank in the relation.

After determining the order in which ranks are considered for registering in the priority queue 118, the copy manager 112 performs for each rank, according to the order, the operations from blocks 204 through 216. At block 204, the copy manager 112 sets a first selected rank i to the first rank in the determined ordering, such as the first rank having the first target extent in the copy relation 150 being registered. If the selected rank i does not comprise one target rank having one target extent in the relation 150 being registered and if (at block 208) there are further unselected ranks in the ordering not yet considered, then the copy manager 112 sets (at block 210) the selected rank i to the next rank in the ordering following the previously processed rank. From block 210 control proceeds back to block 204 to process this next rank in the ordering.

If (at block 206) the selected rank i from the ordering comprises one target rank having one target extent in the relation 150, then the copy manager 112 indicates (at block 212) in the device adaptor assignment data structure 120 a source device adaptor and target device adaptor of the plurality of device adaptors 102a, 102b . . . 102n to use to copy the source extent in the selected source rank, for the selected target rank in the relation, to the selected target rank. The copy manager 112 may use load balancing to balance selection of the source and device adaptors to use to copy the source and target extents with respect to the selected target rank, as described with respect to FIG. 7. The copy manager 112 adds (at block 214) an entry to the priority queue 118 for the relation for the selected target rank to copy the source extent from the selected source rank to the target extent in the selected target rank for the relation using the source and target device adaptors 102a, 102b . . . 102n, as indicated in the device adaptor assignment data structure 120. In one embodiment, the copy manager 112 waits until determining (at block 216) that the copy operation for the source extent and target extent in the processed registered entry 160 has completed before registering a next entry to copy the next source extent to next target extent in the copy relation. After determining that the registered entry has completed (at block 216), the copy manager 112 proceeds to block 208 to process any further ranks in the ordering.

Figure 6:
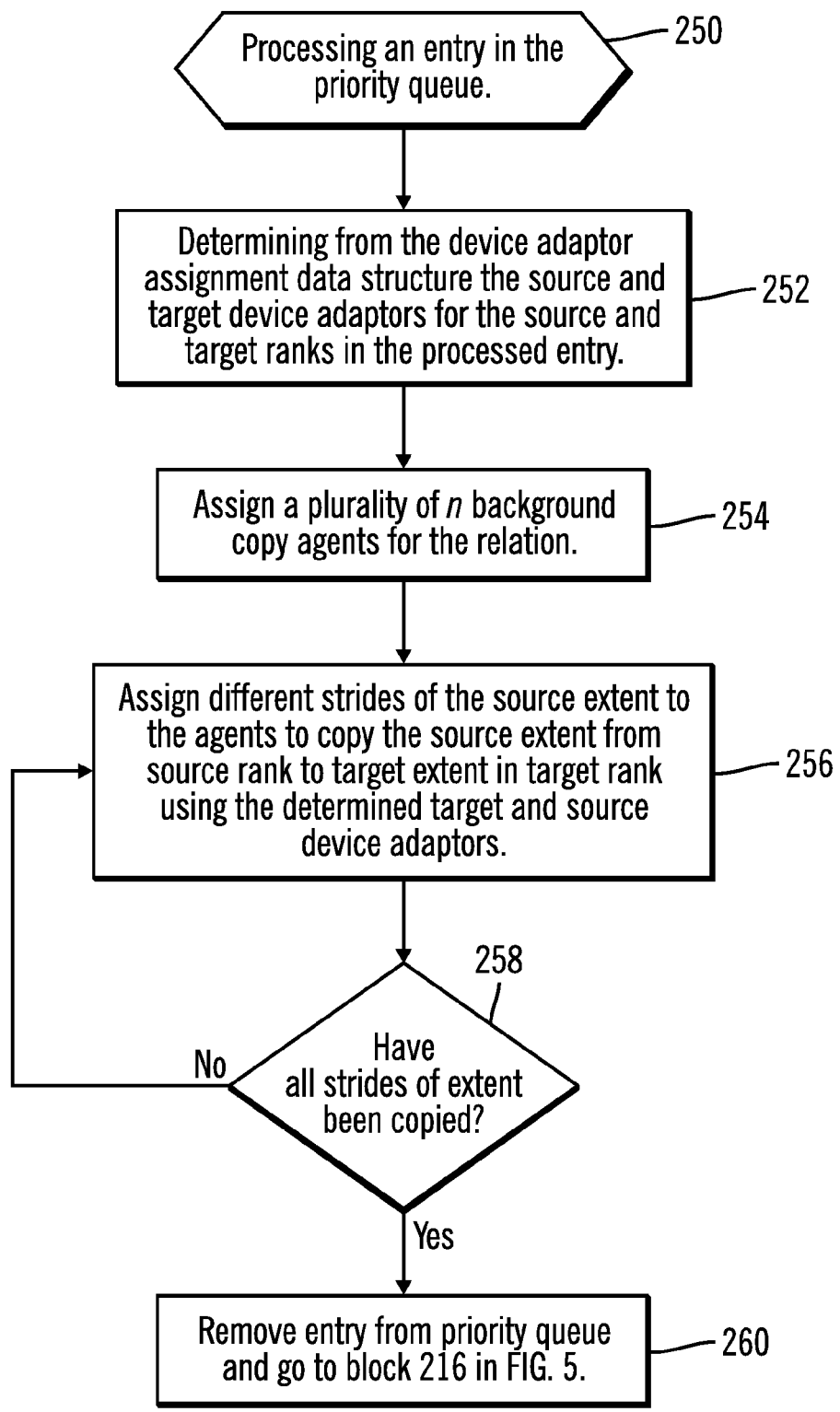
FIG. 6 illustrates an embodiment of operations to assign tasks to registered source and target extents to copy.

FIG. 6 illustrates an embodiment of operations performed by the copy manager 112 to process entries in the priority queue 118. Upon processing (at block 250) an entry 160 in the priority queue 118, the copy manager 112 determines (at block 252) from the device adaptor assignment data structure 120 the source and target device adaptors to use to copy the source 164 and target 166 extents in the source and target ranks in the processed entry 150. The copy manager 114 then assigns (at block 254) a plurality of n background copy agents 116 to copy the registered extents, such as four agents. The copy manager 112 further assigns (at block 256) different strides to the assigned agents 116 to copy the source extent from the source rank to the target extent in target rank using the determined target and source device adaptors 102a, 102b . . . 102n. Strides comprise stripes of the source and target extents written across disks in the rank, where the ranks extend across the disks. In one embodiment, the copy manager 112 may assign strides to the agents by assigning every nth stride of the extent to copy to the n agents, where agents 0 . . . n start at strides 0 . . . n, respectively, and process every nth stride from their starting stride. In this way, the agents start at a same extent, but copy in parallel different strides from the same extent. If (at block 258) all strides have not been copied, then control proceeds to block 256 to have the agents 116 continue to copy the source extents to target extents. Once all strides of the extent have been copied, the copy manager 112 removes (at block 260) the entry 160 that was processed from the priority queue 118 and proceeds to block 216 in FIG. 5 to register further extents in the copy relation.

Figure 1:
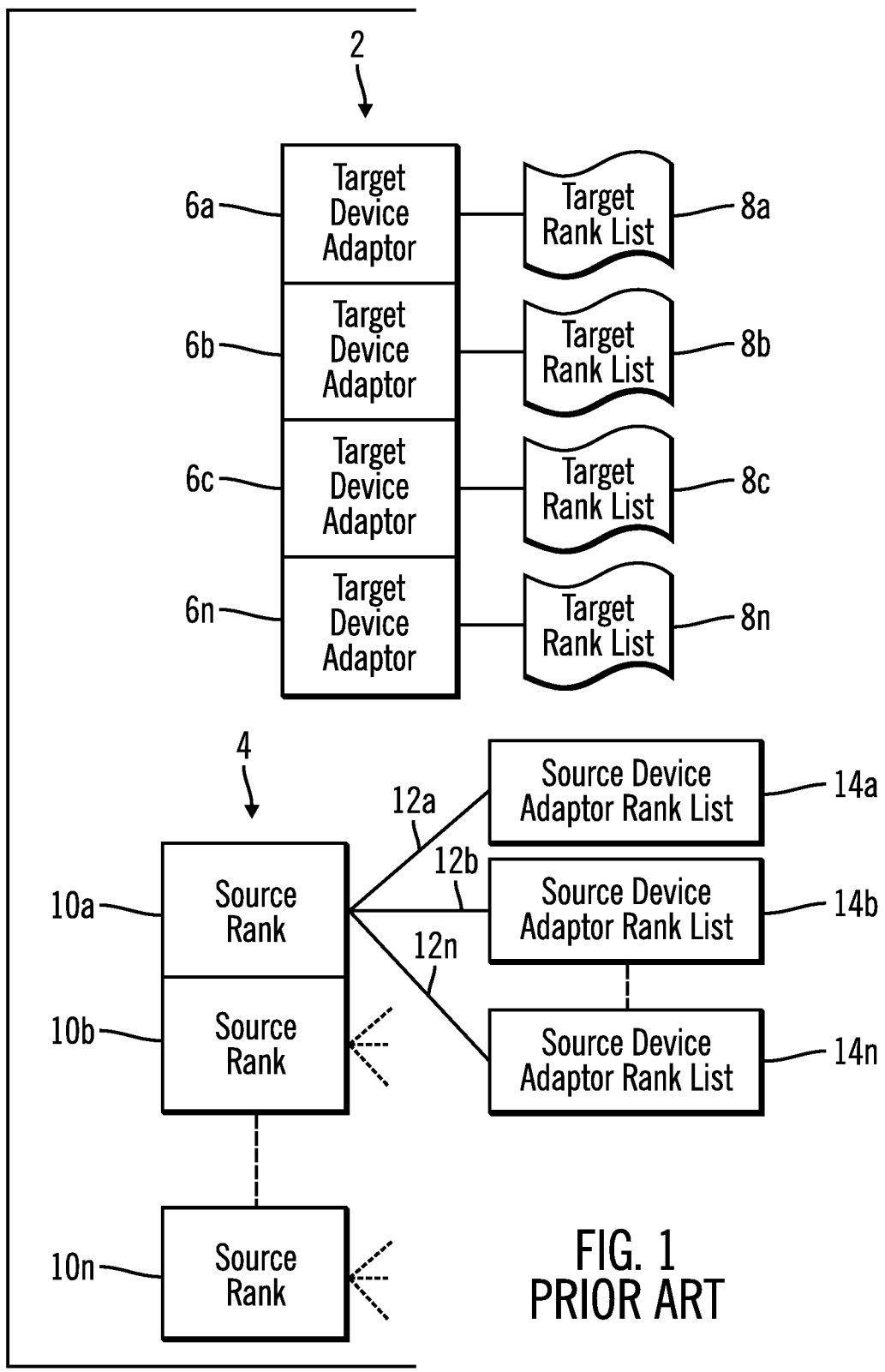
FIG. 1 illustrates a prior art data structure indicating target and source device adaptors assigned to copy ranks in a copy relation.
Figure 7:
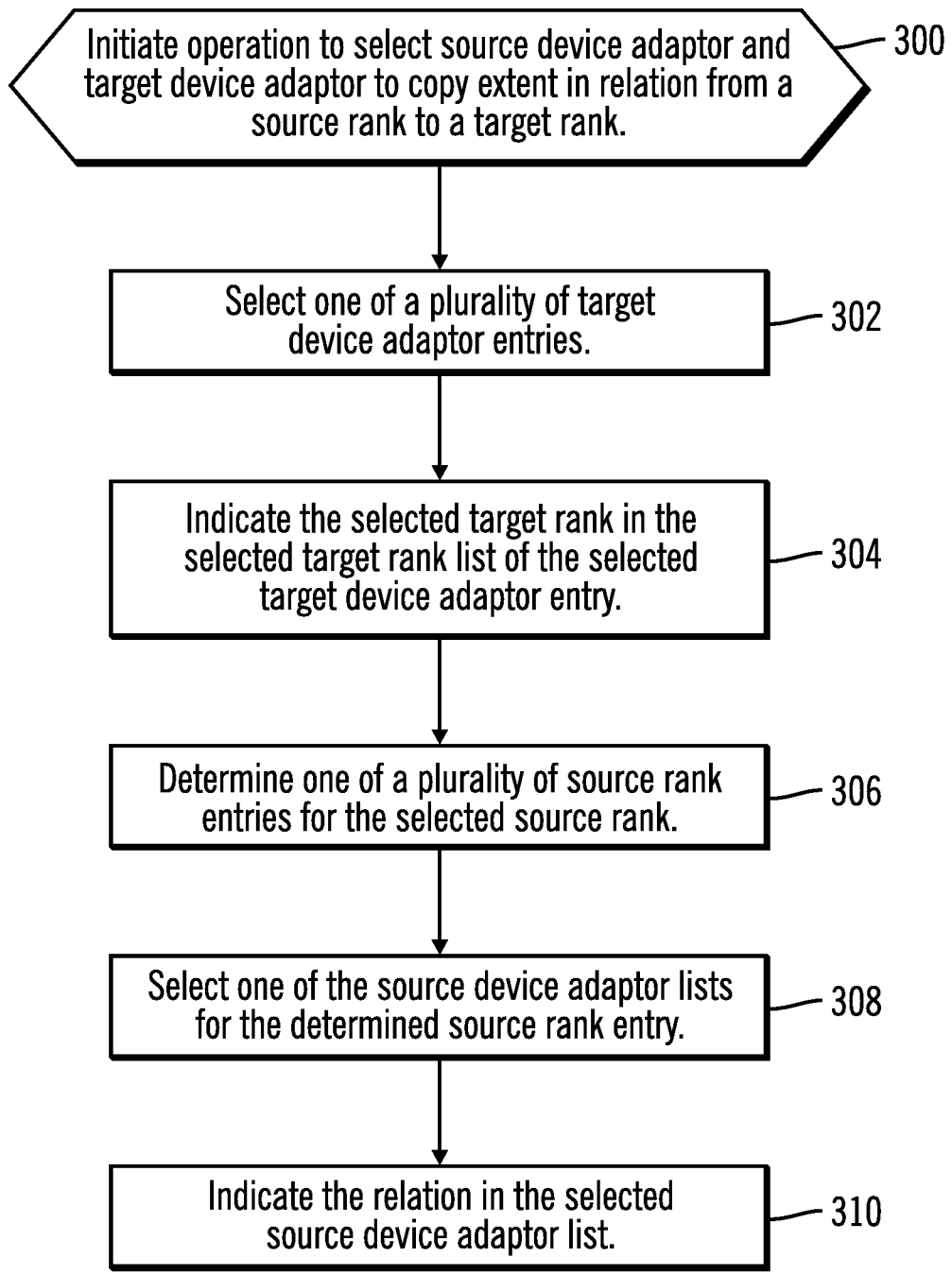
FIG. 7 illustrates an embodiment of operations to select source and target device adaptors to use to copy a source and target extents, respectively, in a copy relation.

FIG. 7 illustrates an embodiment of operations performed by the copy manager 112 to select source and target device adaptors 102a, 102b . . . 102n to use to copy the source extent to the target extent using the data structure shown in FIG. 1. Upon initiating (at block 300) the operation to select the source and target device adaptors to use to copy the extent in the relation, the copy manager 112 selects (at block 302) one of the target device adaptor entries 6a, 6b, 6c . . . 6n. Target device adaptor entries 6a, 6b, 6c . . . 6n may be selected using a round robin algorithm, a load balancing algorithm based on current usage of the target device adaptors 102a, 102b . . . 120n or some other balancing selection technique. The copy manager 112 indicates (at block 304) the selected target rank to copy in the target rank list 8a, 8b, 8c . . . 8n of selected target device adaptor entry 6a, 6b, 6c . . . 6n.

The copy manager 112 further determines (at block 306) one of a plurality of the source rank entries 10a, 10b . . . 10n (FIG. 1) that represents the selected source rank including the source extent to copy to the selected target extent. The copy manager 112 then selects (at block 308) one of the source device adaptor lists 14a, 14b . . . 14n for the determined source rank entry 10a, 10b . . . 10n. The source device adaptor list 14a, 14b . . . 14n for the source rank involved may be selected using a round robin algorithm, a load balancing algorithm based on current usage of the device adaptors 102a, 102b . . . 120n or some other balancing selection technique. The copy manager 112 then indicates (at block 310) the relation involved in the copying in the selected source device adaptor list 14a, 14b . . . 14n for the selected source rank 10a, 10b . . . 10n.

The described embodiments provide techniques for allocating device adaptors as the source and target device adaptors used to copy a source extent to a target extent in a copy relation, determine an order in which source and target extents are registered for copying, and then assign tasks to the source and target extents registered to copy.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variable "n" when used to represent a variable number of an element may indicate any number of instances of the element, and may indicate different integer numbers when used with different elements or when used with different instances of the same element. For instance variable "n" as used to indicate the last target device adaptor $6n$, last source rank $10n$, last source device adaptor rank list $14n$, last anchor $12n$, last device adaptor $102n$ may indicate the same or different number of these elements, i.e., the number of target device adaptors $6a \ldots 6n$, source ranks $10a \ldots 10n$, source device adaptor rank lists $14a \ldots 14n$, anchors $12a \ldots 12n$, and device adaptors $102a \ldots 102n$ may be the same or different.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for copying data in a storage system comprised of ranks of extents of data by performing operations, the computer program product comprising a non-transitory computer readable storage medium having computer readable program code embodied therein that executes to communicate with device adaptors and to perform operations, the operations comprising:
   providing copy relation information for a copy relation to copy a plurality of source extents in source ranks to a plurality of target extents in target ranks in the storage system;
   using one target rank in the copy relation to determine an order in which the target ranks in the copy relation are selected to register for copying;
   performing, for each selected target rank in the copy relation selected according to the determined order, an iteration of a registration operation to register the selected target rank and a selected source rank copied to the selected target rank in the copy relation, wherein the registration operation comprises:
      indicating in a device adaptor assignment data structure a source device adaptor and target device adaptor of the device adaptors to use to copy the selected rank to the selected target rank;
      adding an entry to a priority queue for the copy relation for the selected target rank; and
      copying the selected source rank to the selected target rank using the source and target device adaptors indicated in the device adaptor assignment data structure for the selected target rank in response to processing the entry in the priority queue added to the priority queue for the selected target rank.

2. The computer program product of claim 1, wherein the operations further comprise:
   performing an additional iteration of the registration operation for a next selected target rank according to the determined ordering, in response to completing the copying of a previously selected target rank for which the entry was added to the priority queue.

3. The computer program product of claim 1, wherein the order indicates ranks in the storage system including the target ranks in the copy relation, wherein each iteration of the registration operation is performed for each rank in the storage system according to the order, wherein the registration operation is performed for the selected rank in the storage system by:
   determining whether the selected rank in the storage system comprises one target rank in the relation, wherein the operations of indicating in the device adaptor assignment data structure the source device adaptor and target device adaptor and the adding of the entry to the priority queue are performed for the selected rank in the storage system in response to determining that the selected rank comprises one target rank in the relation.

4. The computer program product of claim 1, wherein the target rank used to determine the order in which target ranks are selected for copying comprises a first target rank including a first target extent to which a source extent in the copy relation is copied.

5. The computer program product of claim 4, wherein the determined order comprises the first rank in the relation to a maximum number of ranks in the storage system and then from a first rank in the storage system to a rank in the storage system preceding the first rank in the copy relation.

6. The computer program product of claim 5, wherein each iteration of the registration operation is performed for each selected rank in the storage system according to the order, wherein the registration operation is performed for the selected rank in the storage system by:
   determining whether the selected rank in the storage system comprises one target rank in the relation, wherein the operations of indicating in the data structure the source device adaptor and target device adaptor and adding the entry is performed for the selected rank in the storage system in response to determining that the selected rank comprises one target rank in the copy relation.

7. The computer program product of claim 1, wherein the copying of the source rank in the selected source rank to the target rank in the selected target rank in response to processing the entry in the priority queue comprises assigning background copy agents to copy the source extent to the target extent.

8. The computer program product of claim 7, wherein the ranks comprise RAID ranks, wherein extents are configured in the ranks, and wherein each agent copies different strides of the source rank to the target rank using the source device adaptor indicated in the rank data structure.

9. The computer program product of claim 7, wherein the operations are performed in a storage controller coupled to the storage system, wherein the storage controller is coupled to the storage system through the device adaptors, and wherein the device adaptors connect to storage units having the ranks in the storage system.

10. The computer program product of claim 1, wherein indicating in the rank data structure the source device adaptor and the target device adaptor comprises:
   selecting one of a plurality of target device adaptor entries;
   indicating the selected target rank in the selected target device adaptor entry;
   determining one of a plurality of source rank entries for the selected source rank, wherein the source rank entries include a source device adaptor list for each of a plurality of source device adaptors, wherein each source device adaptor list indicates copy relations processed by the source device adaptor associated with the source device adaptor list;
   selecting one of the source device adaptor lists for the determined source rank entry; and
   indicating the copy relation in the selected source device adaptor list.

11. A method for copying data in a storage system comprised of ranks of extents of data, comprising:
   providing copy relation information for a copy relation to copy a plurality of source extents in source ranks to a plurality of target extents in target ranks in the storage system;
   using one target rank in the relation to determine an order in which the target ranks in the copy relation are selected to register for copying;
   performing, for each selected target rank in the copy relation selected according to the determined order, an iteration of a registration operation to register the selected target rank and a selected source rank copied to the selected target rank in the relation, wherein the registration operation comprises:
      indicating in a device adaptor assignment data structure a source device adaptor and target device adaptor to use to copy the selected rank to the selected target rank;
      adding an entry to a priority queue for the copy relation for the selected target rank; and
      copying the selected source rank to the selected target rank using the source and target device adaptors indicated in the device adaptor assignment data structure for the selected target rank in response to processing the entry in the priority queue added to the priority queue for the selected target rank.

12. The method of claim 11, further comprising:
   performing an additional iteration of the registration operation for a next selected target rank according to the determined ordering, in response to completing the copying of a previously selected target rank for which the entry was added to the priority queue.

13. The method of claim 11, wherein the order indicates ranks in the storage system including the target ranks in the copy relation, wherein each iteration of the registration operation is performed for each rank in the storage system according to the order, wherein the registration operation is performed for the selected rank in the storage system by:
   determining whether the selected rank in the storage system comprises one target rank in the copy relation, wherein the operations of indicating in the device adaptor assignment data structure the source device adaptor and target device adaptor and the adding of the entry to the priority queue are performed for the selected rank in the storage system in response to determining that the selected rank comprises one target rank in the relation.

14. The method of claim 11, wherein the target rank used to determine the order in which target ranks are selected for copying comprises a first target rank including a first target extent to which a source extent in the copy relation is copied.

15. The method of claim 11, wherein the copying of the source rank in the selected source rank to the target rank in the selected target rank in response to processing the entry in the priority queue comprises assigning background copy agents to copy the source extent to the target extent.

16. The method of claim 15, wherein the ranks comprise RAID ranks, wherein extents are configured in the ranks, and wherein each agent copies different strides of the source rank to the target rank using the source device adaptor indicated in the rank data structure.

17. The method of claim 11, wherein indicating in the rank data structure the source device adaptor and the target device adaptor comprises:
   selecting one of a plurality of target device adaptor entries;
   indicating the selected target rank in the selected target device adaptor entry;
   determining one of a plurality of source rank entries for the selected source rank, wherein the source rank entries include a source device adaptor list for each of a plurality of source device adaptors, wherein each source device adaptor list indicates copy relations processed by the source device adaptor associated with the source device adaptor list;
   selecting one of the source device adaptor lists for the determined source rank entry; and
   indicating the copy relation in the selected source device adaptor list.

18. A system for copying data in a storage system comprised of ranks of extents of data, comprising:
   a plurality of device adaptors;
   a processor;
   a memory including copy relation information for a copy relation to copy a plurality of source extents in source ranks to a plurality of target extents in target ranks in the storage system;
   a computer readable storage medium including code executed by the processor to perform operations, the operations comprising:
      using one target rank in the copy relation to determine an order in which the target ranks in the copy relation are selected to register for copying;
      performing, for each selected target rank in the copy relation selected according to the determined order, an iteration of a registration operation to register the selected target rank and a selected source rank copied to the selected target rank in the copy relation, wherein the registration operation comprises:
         indicating in a device adaptor assignment data structure a source device adaptor and target device adaptor of the plurality of device adaptors to use to copy the selected rank to the selected target rank;
         adding an entry to a priority queue for the copy relation for the selected target rank; and
         copying the selected source rank to the selected target rank using the source and target device adaptors indicated in the device adaptor assignment data structure for the selected target rank in response to processing the entry in the priority queue added to the priority queue for the selected target rank.

19. The system of claim 18, wherein the operations further comprise:
   performing an additional iteration of the registration operation for a next selected target rank according to the determined ordering, in response to completing the copying of a previously selected target rank for which the entry was added to the priority queue.

20. The system of claim 18, wherein the order indicates ranks in the storage system including the target ranks in the relation, wherein each iteration of the registration operation is performed for each rank in the storage system according to the order, wherein the registration operation is performed for the selected rank in the storage system by:
   determining whether the selected rank in the storage system comprises one target rank in the copy relation, wherein the operations of indicating in the device adaptor assignment data structure the source device adaptor and target device adaptor and the adding of the entry to the priority queue are performed for the selected rank in the storage system in response to determining that the selected rank comprises one target rank in the copy relation.

21. The system of claim 18, wherein the target rank used to determine the order in which target ranks are selected for copying comprises a first target rank including a first target extent to which a source extent in the copy relation is copied.

22. The system of claim 18, wherein the copying of the source rank in the selected source rank to the target rank in the selected target rank in response to processing the entry in the priority queue comprises assigning background copy agents to copy the source extent to the target extent.

23. The system of claim 22, wherein the ranks comprise RAID ranks, wherein extents are configured in the ranks, and wherein each agent copies different strides of the source rank to the target rank using the source device adaptor indicated in the rank data structure.

24. The system of claim 18, wherein indicating in the rank data structure the source device adaptor and the target device adaptor comprises:
   selecting one of a plurality of target device adaptor entries;
   indicating the selected target rank in the selected target device adaptor entry;
   determining one of a plurality of source rank entries for the selected source rank, wherein the source rank entries include a source device adaptor list for each of a plurality of source device adaptors, wherein each source device adaptor list indicates copy relations processed by the source device adaptor associated with the source device adaptor list;
   selecting one of the source device adaptor lists for the determined source rank entry; and
   indicating the copy relation in the selected source device adaptor list.

\* \* \* \* \*